United States Patent [19]

Damongeot

[11] Patent Number: 5,035,577

[45] Date of Patent: Jul. 30, 1991

[54] BLADE FOR AN AIRCRAFT ROTOR AND ROTOR COMPRISING SUCH A BLADE

[75] Inventor: Alain Damongeot, Ventabren, France

[73] Assignee: Aerospatiale Societe Nationale Industrielle, Paris, France

[21] Appl. No.: 409,429

[22] Filed: Sep. 19, 1989

[30] Foreign Application Priority Data

Sep. 19, 1988 [FR] France .................. 88 12188

[51] Int. Cl.⁵ .............................................. B64C 11/18
[52] U.S. Cl. .................................. 416/223 R; 416/228; 416/DIG. 2; 416/DIG. 5
[58] Field of Search ................... 416/223 R, 228, 238, 416/DIG. 2, DIG. 5

[56] References Cited

U.S. PATENT DOCUMENTS

| 3,822,105 | 7/1974 | Jepson | 416/223 |
|---|---|---|---|
| 4,564,337 | 1/1986 | Zimmer et al. | 416/223 R |
| 4,744,728 | 5/1988 | Lednicer et al. | 416/223 R |
| 4,880,355 | 11/1989 | Vuillet et al. | 416/228 |
| 4,927,330 | 5/1990 | Asboth | 416/223 R |

FOREIGN PATENT DOCUMENTS

| 365940 | 1/1932 | United Kingdom | 416/DIG. 2 |
|---|---|---|---|
| 512487 | 9/1939 | United Kingdom | 416/DIG. 2 |

Primary Examiner—John T. Kwon
Attorney, Agent, or Firm—Fisher, Christen & Sabol

[57] ABSTRACT

A blade is overtwisted in the extremity zone from at least 0.85R so that the resulting twist is at least equal to a limiting twist $\theta limC$ according to the plane form $Co/C(r)$ of the blade in this zone and so that the lift coefficient Cz has, in a first fraction of the extremity zone extending at least between $r=0/85R$ and $r=0.9R$, a decreasing value remaining lower than a first limiting value $CZlim1 = Czm - a(r/R - b)$, Czm being the mean lift coefficient of the rotor and a and b being experimental constants, and in a second extremity fraction extending between $r=0.9R$ and at least $r=0.95R$, the lift coefficient continues to decrease by remaining less than or equal to a second limiting value Czlim2 linearly decreasing from the value Czlim1 for $r=0.9R$ as far as the zero value for $r=R$.

7 Claims, 5 Drawing Sheets

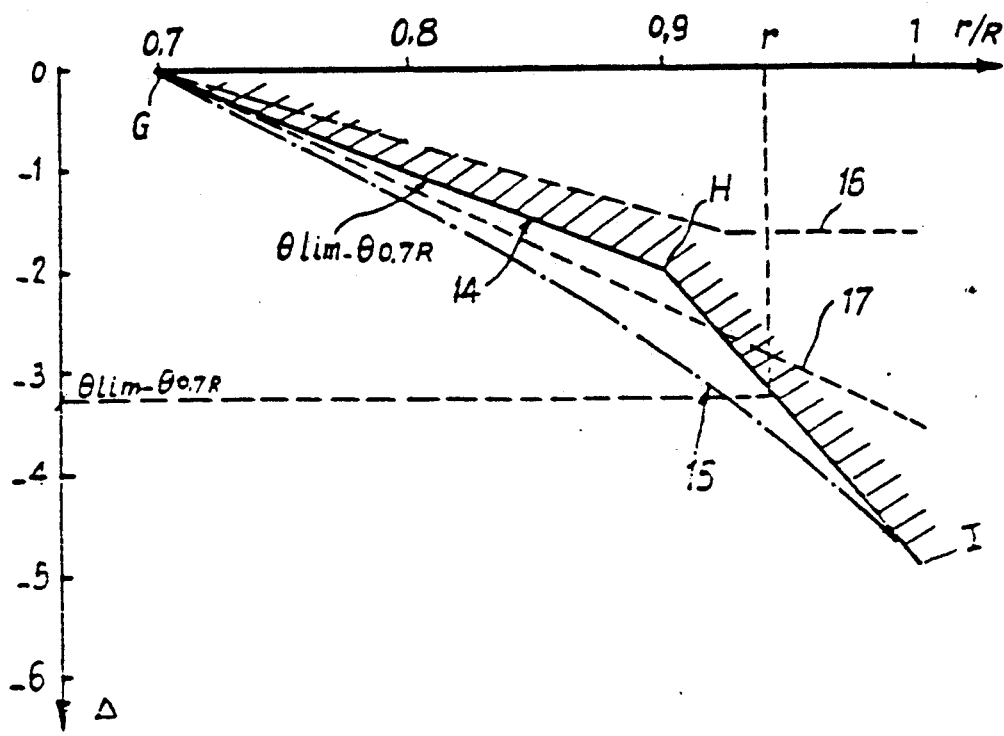
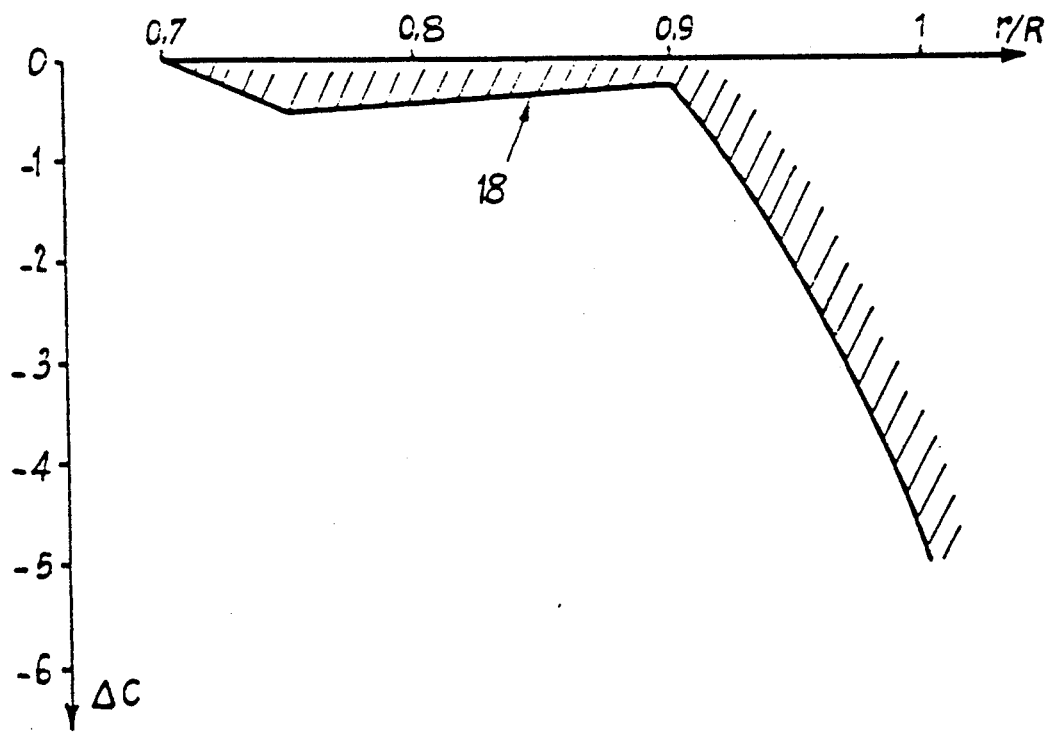

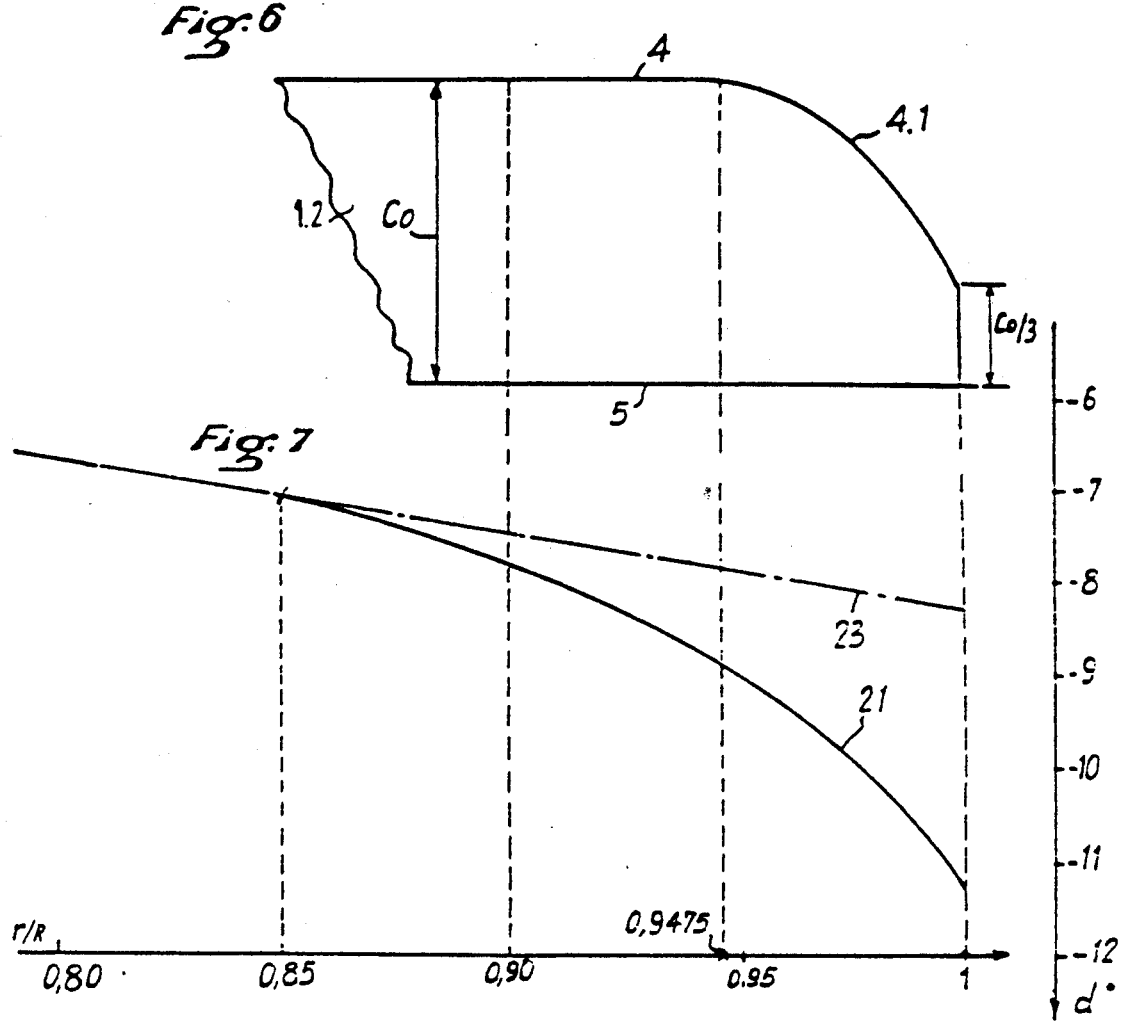

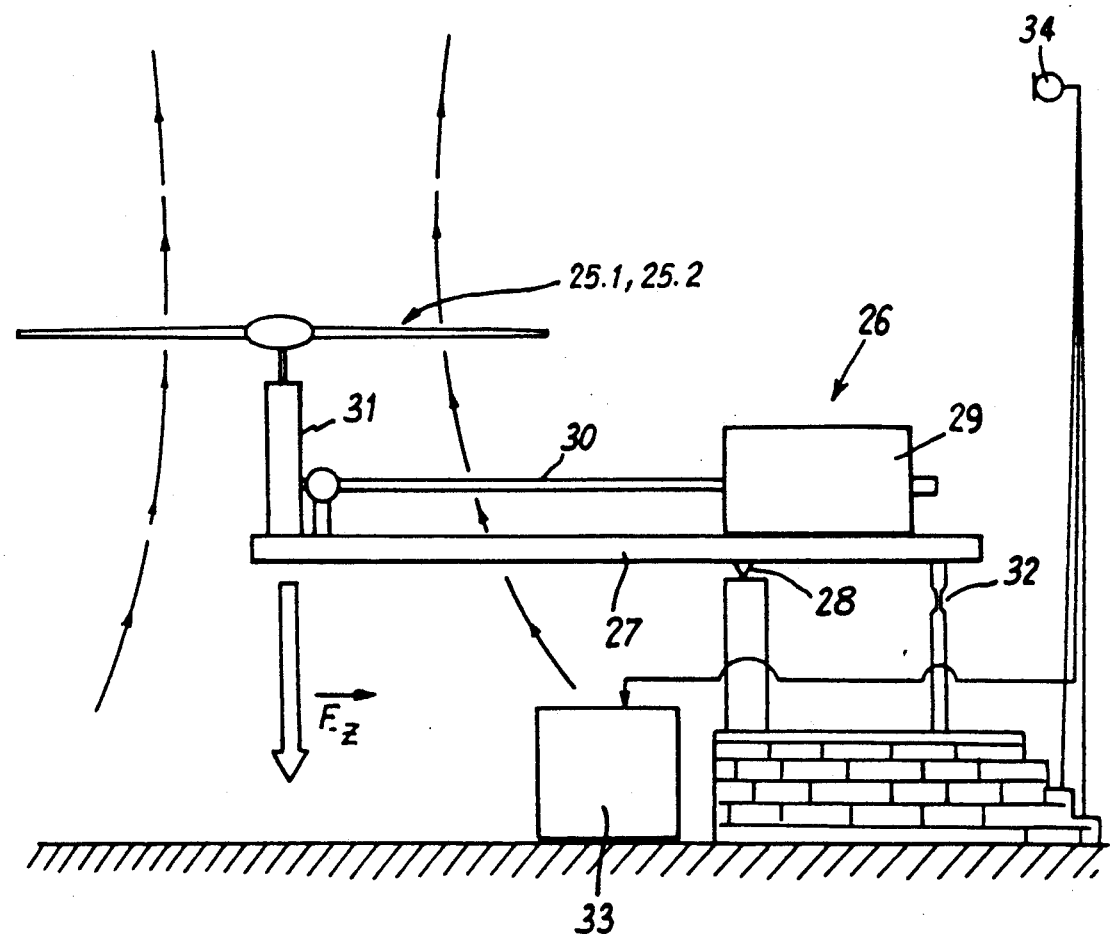

BLADE FOR AN AIRCRAFT ROTOR AND ROTOR COMPRISING SUCH A BLADE

FIELD OF THE INVENTION

The present invention concerns improvements to the blades of aircraft rotors, as well as the rotors comprising such improved blades.

BACKGROUND OF THE INVENTION

It is known that, if one considers a rotor blade so that its successive elementary sections along the wingspan have a constant chord and that the chords of said elementary sections are coplanar, the elementary lift and drag forces connected to each of said elementary blade sections vary appreciably, just like the square of the distance of a given elementary section to the axis of rotation of the rotor. As a result, the extremity zone of the blade has a significant effect on the aerodynamic functioning of the rotor and the resulting aerodynamics of the lift and drag forces occur on about 75% of the wingspan of the blade.

Moreover, it is known that, so as to better adapt the incidence of successive elementary sections to air speeds the latter encounter owing to rotation of the blade, the twist of such a blade around its longitudinal axis is generally carried out so as to make the latter operate at high pitch close to the rotation axis of the rotor where the speed is low and at low pitch where the speed is higher. Such a twist is generally linear, in other words the elementary variation $d\theta$ of the twist angle $\theta$ on a wingspan variation $dr$ is constant. By means of such a measurement, it is possible to improve the working fineness $Cz/Cx$ of profiles along the wingspan of the blade. However, as proved from many experiments, an extremely intense edge vortex is formed at the blade extremity resulting from the compensation of pressure differences existing between the lower wing surface and the upper wing surface of sections close to the extremity. The presence of this edge vortex leads firstly to an increase of the power consumed by the rotor and secondly to a significant emission of noise, both at low running speeds by interaction between the vortex and the following blades which intercept it, and high running speeds owing to extreme running aerodynamic conditions accompanied by the appearararance of air compressibility in these conditions and the presence of shock waves.

SUMMARY OF THE INVENTION

The object of the present invention is to produce a blade extremity which particularly reduces the formation of the edge vortex and which enables the aerodynamic performances of a rotor to be improved and allows operating noises to be reduced.

It consists of twisting the end zone of the blade from 70% of the wing span so that the lift coefficient of sections progressively reduces until a value approximately equal to nil occurs at the blade extremity. Thus, without affecting the overall lift of the blade end zone, high pressure differences between the lower wing surface and the upper wing surface are suppressed and the formation conditions of the edge vortex there are eliminated.

To this end, according to the invention, the blade for an aircraft air rotor, whose successive elementary sections along the wing span R exhibit a constant chord Co and are twisted from the root of the blade towards the extremity of the latter by an angle $\theta$ whose variation $d\theta/dr$ according to the relative wing span r of a given elementary section is constant, is notable in that said blade exhibits, in the extremity zone extending at least between 0.85 R and at least 0.95 R, an excess twist being such that:

the resultant twist in said zone is less than or at the most equal as an absolute value to a limiting twist given by:

$$\theta lim = \theta + 1/k(Czlim - Cz), \qquad (1)$$

an equation in which $k = dCz/di$ represents the variation of the lift coefficient $Cz$ with respect to the incidence variation $i$ in degrees, (for a Mach number of 0.6 towards the blades extremity, the coefficient $k$ then being equal to 0.13) and $Czlim$ is an upper limiting twist value of the lift coefficient $Cz$ so that, firstly, in a first fraction of the extremity zone extending at least between $r = 0.85$ R and approximatively $r = 0.9$ R, this limiting lift coefficient has a value $$Czlim1 = Czm - a(r/R - b), \qquad (2)$$

an equation in which $Czm$ is the mean lift coefficient of said rotor, and $a,b$ are constants at least respectively equal to 1.6 and 0.87, and so that secondly, in a second fraction of the extremity zone extending approximatively between $r = 0.9$ R and at least $r = 0.95$ R, the limiting lift coefficient $Czlim2$ has a value defined by a line segment passing through the value of $Czlim1$ given by the equation (2) for $r = 0.9$ R and by the value $Cz = 0$ for $r = R$.

The first extremity zone fraction may extend on the wingspan between $r = 0.7$ R and approximatively $r = 0.9$ R. Moreover, said second fraction of the extremity zone can extend approximatively between $r = 0.9$ R and $r = R$.

As described subsequently, if a rotor blade satisfies as regards its twist the above conditions, its distribution of the wingspan lift coefficient, characterized by a progressive fall to a nil value, makes it possible to substantially reduce the formation of the edge vortex and accordingly results in an increase of performances and a reduction of operating noise.

The implementation of this invention as regards the functioning of blades with linear twist is particularly advantageous, since the chord dynamic centering of said blade in the extremity zone is not modified so that the overall balance of the blade functioning on the aircraft is not altered.

In the case where, in said first and second fractions of the extremity zone, the chord of said successive elementary sections of the blade is no longer constant or is not almost constant but evolves according to the wingspan position r of said elementary sections, the wing of said extremity blade undergoes, with respect to a rectangular blade, a wing variation and thus a variation of the lift coefficient. It is therefore necessary to take account of this.

Equally, when in said first and second fractions of the extremity zone, said successive elementary sections exhibit an evolutive chord C, which is a function $C(r)$ of the wingspan position r of the section involved, the twist of said blade is, as an absolute value, advantageously at least equal to the limiting twist $\theta limC$ given by:

$$\theta limC = \theta + 1/k(Czlim \cdot Co/C(r) - Cz), \quad (3)$$

an expression wherein the lift coefficient Czlim is selected in said fractions of the extremity zone as being equal at the most to a limiting value CzlimC so that $$Czlimc = Czlim \cdot Co/C(r), \quad (4)$$

an expression wherein Czlim represents either Czlim1 or Czlim2 defined above for a rectangular blade according to that of said first or second fractions of the extremity zone in question.

Experience has shown that the twist limits $\theta$lim and $\theta$limC respectively given by the equations (1) and (3) could possibly be exceeded, provided the absolute value of the real twist angle communicated to the blade is, in all respects of said first and second zone fractions, at least equal to the corresponding value of $\theta$lim or $\theta$limC, reduced by 0.5°.

Moreover, for reasons relating to construction, it is frequently advantageous that said equations (1) and (3) are applied in a second extremity zone fraction defined by the range extending from approximatively r=0.9 R to r=0.95 R and by the point r=R, a linear twist connection being embodied between r=0.95 R and r=R, irrespective of the function C(r).

BRIEF DESCRIPTION OF THE DRAWINGS

The figures of the drawing shall clearly explain how the invention is to be embodied. On these figures, identical references denote similar elements.

FIG. 3 illustrates the limiting distribution of the twist angle enabling the blade of FIG. 1 to satisfy the improvement conditions defined by the present invention.

FIG. 5 is a diagram giving, according to the relative wingspan r/R, the twist limit according to the invention for the blade of FIG. 4.

FIG. 6 shows on a larger scale the end of a blade with parabolic extremity leading edge.

FIG. 7 is a diagram representing the evolution of the twist shown on FIG. 6.

FIG. 8 is, according to the invention, the twist of the blade of FIG. 6 with respect to the limits according to the present invention.

FIG. 9 diagrammatically illustrates an installation for testing rotors making it possible to measure their lift and the power consumed for driving them in rotation, as well as to measure the noise generated.

DETAILED DESCRIPTION OF THE PREFERRED EMBODIMENTS

Figure 1:
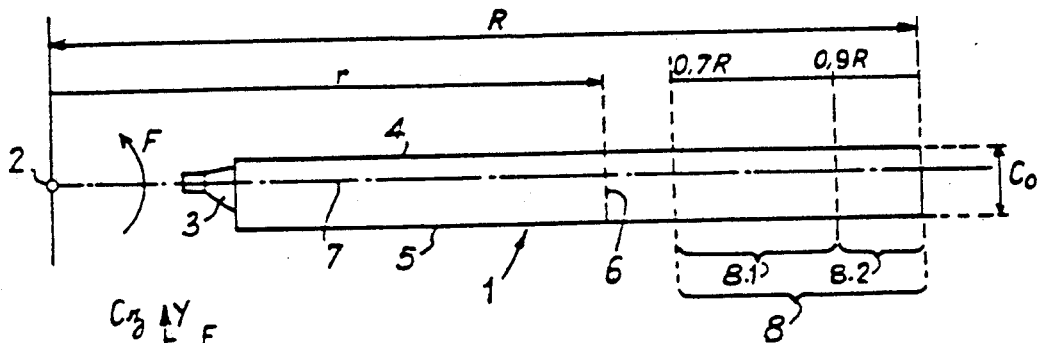
FIG. 1 is a diagrammatical plan view of a rectangular blade for a rotor.

The blade 1, represented as a plan view on FIG. 1, is intended to be rotary-driven counterclockwise (arrow F) around an axis 2 orthogonal to the plane of the figure by means of a boss (not represented). It comprises a blade foot 3 enabling it to be connected to said boss. It forms part of an aircraft rotor comprising a plurality of such blades 1.

The leading edge 4 and the trailing edge 5 of said blade 1 are parallel, so that the blade is rectangular and the chords of the successive profiles constituting it is constant and equal to Co. The wingspan of said blade reckoned from said spin axis 2 is equal to R. r denotes the wingspan distance separating a special section 6 of the axis 2.

Moreover, said blade is twisted around its twist axis 7 which could also be its pitch setting axis. The word "twist" is understood to mean the angular evolution along the wingspan R of the zero-lift chord of the profiles or sections 6.

Usually as regards helicopter blades, the twist of the blade 1 is constant along the wingspan R, namely that it is a linear function of r. It is for example equal to $-10°$ (the minus sign denoting that the blade pitch of profiles decreases from the root of blade 1 towards its extremity).

Figure 2:
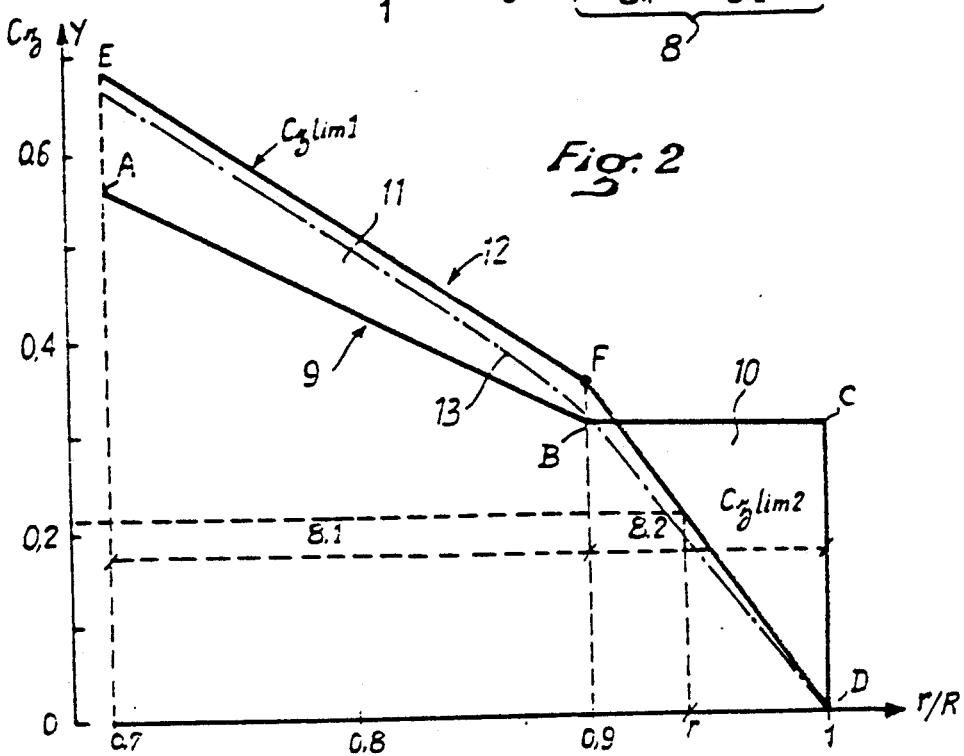
FIG. 2 is a diagram representing, according to the relative wingspan r/R, the real distribution of the lift coefficient of the blade of FIG. 1, and the limiting distribution according to the present invention.

If, for example by measuring the pressures exerted at various points distributed along said blade, the lift coefficient Cz is determined along the latter, in its outer back end 8 between the sections respectively separate from the axis 2 by a distance 0.7 R and the distance R, it is possible to plot a curve whose course is that of the curve 9 diagrammatically shown on FIG. 2 for a slow and average speed flight range on the level or sloping slightly.

This diagrammatical curve 9 mainly comprises three successive sections:

a first section AB which is roughly linear and decreasing corresponding to a first zone fraction 8.1 of the end part 8 and extending between the relative wingspans r/R respectively equal to about 0.7 and 0.9, said first section AB able to be represented by the equation:

$$Cz = CZm - k1(r/R - k2) - \lambda \sin \psi$$

in which:

Czm is the mean lift coefficient of the rotor to which belongs blade 1, this mean lift coefficient Czm being itself defined by the expression:

$$Czm = \frac{6 Fz}{\rho S \sigma U^2}$$

in which Fz is the lift force of the rotor, $\rho$ the air density, S the surface of the disk formed by the rotor; $\sigma$ the fullness of this disk (namely the ratio between the product of the number of blades 1 by the surface of one blade and the surface S) and U the relative velocity of air; for the majority of helicopters, CZm is about 0.4 or 0.5;

$\lambda$ is the aircraft propulsion parameter, namely the ratio between the propulsion speed of said aircraft and the peripheral speed of its rotor; for a large number of helicopters, $\lambda$ is between 0.25 and 0.35 for current cruising speeds;

$\psi$ is the azimuth of the blade 1 ($\psi = 0$ when the blade 1 is in the rear position). To simplify matters, a mean azimuth of 180° may be taken. In these circumstances, $\sin \psi = 0$ and $\lambda \sin \psi = 0$.

k1 and k2 are constants close to 1; for example, k1 is equal to 1.2 and k2 is equal to 0.83 in the particular experimental case for which the Applicant has carried out flight pressure measurements.

a second section BC, equally roughly linear, corresponding to a second fraction of the zone 8.2 of the end part 8 extending between the relative wingspans r/R respectively equal to approximately 0.9 and 1, and in which the value of Cz remains virtually constant; and a third section CD corresponding to a sudden fall of the coefficient Cz close to the relative wingspan equal to 1.

Such a curve 9 is qualitatively representative of the change of the lift coefficient of all linear twist rectangular blades in the normal case where said twist is kept constant as far as the blade end.

Owing to the distribution of the lift coefficient Cz along the line BCD at the blade end, the edge vortices are significant so that the performances of rotors equipped with such blades 1 are affected and its operation is noisy.

To overcome these drawbacks, the present invention for example provides replacing between the relative wingspans 0.9 and 1 the line BCD by a line FD corresponding to a linear decrease to zero of the lift coefficient Cz, the slope of the line FD being determined by the improvement of the performance sought-after. Thus, the edge vortices are minimized. As a result, the blade undergoes a loss of lift corresponding to the area of the triangle 10 delimited between the lines BC, CD and FD.

Thus, if it is desired to maintain the overall lift constant, it is necessary to increase the lift coefficient before 0.9 R, for example between 0.7 R and 0.9 R.

This is obtained by a distribution of the lift coefficient Cz between 0.7 R and 0.9 R, such as the one represented by the line EF disposed above the line AB. Thus, between the lines AB and EF an area 11 is delimited corresponding to a lift increase able to compensate for the loss represented by the triangle 10.

Thus according to the invention, it can be seen that distribution of the lift coefficient between r=0.7 R and r=R comprises lines EF and FD. This curve 12 constitutes an upper limit, under which the real distribution of the lift coefficient of the blade 1 occurs. The curve 13 shown by the dot-and-dash lines illustrates an example of a real lift coefficient distribution.

Moreover, according to the invention, the ordinate Y of the portion EF of the curve 12 satisfies the equation:

$$Y = Czm - 1.6(r/R - 0.87) - \lambda \sin \psi$$

in which Czm is the mean lift coefficient of the rotor belonging to the blade 1, $\lambda$ is the propulsion parameter of the aircraft and $\psi$ is the azimuth of the blade 1. More simply, it is possible, as previously, to take $\psi = 180°$, which results in $\lambda \sin \psi$ being annulled. This portion EF of the curve 12 thus constitutes an upper limit Czlim1 for the lift coefficient Cz of the blade 1 improved according to the invention between 0.7 R and 0.9 R. Similarly, the portion FD of the curve 12, preferably rectilinear, constitutes an upper limit CZlim2 for the lift coefficient CZ of the blade 1 improved according to the invention between 0.9 R and R.

According to another special characteristic of the present invention, in order to determine the curve 12 defining the limits Czlmi1 and Czlim2, a lower limit, such as the one represented by the curve 14 on FIG. 3, is assigned to the absolute value of the twist of the improved blade 1. FIG. 3 shows in abscissae the relative wingspan r/R of the various successive sections of the blade 1 between r=0.7 R and r=R and in ordinates the difference $\Delta$ (in degrees) between the twist limiting angle $\theta$lim of said sections and the twist angle $\theta$0.7 R of the section disposed at r= 0.7 R. This curve 14 comprises a first part GH corresponding to the part EF (Czlim1) of the curve 12, and a second part HI corresponding to the part FD (Czlim2) of said curve 12. This FIG. 3 shows also a curve 15 defining a law of twist corresponding to distribution of the lift coefficient Cz, illustrated by the curve 13 of the FIG. 2, as well as two curves 16 and 17 corresponding to known helicopter blades. The curve 16 concerns a rectangular blade having a total linear twist of $-7.3°$ between r=0 and r=0.925 R and an unvaried twist between r=0.925 R and r=R. The curve 17 concerns a blade having a total linear twist of $-12°$ between r=0 and r=R. It can be seen that these two curves 16 and 17 are totally or partially disposed outside the twist limit $\theta$lim defined by the curve 14. This twist limit $\theta$lim is given by the expression $$\theta lim = \theta + 1/k(Czlim - Cz) \qquad (2)$$

in which k represents dCz/di (i=incidence). Generally, k is close to 0.13.

Thus, as regards any elementary section 6 of the blade 1, whose wingspan distance r is between 0.7 R and R, the twist limiting angle $\theta$lim according to the improvement of the invention is equal to the twist angle $\theta$ of said section prior to improvement, increased by the corrective term 1/k (Czlim−Cz), in which Czlim is the value defined by the curve 12 for said distance r and Cz is the value of the lift coefficient for said section 6 before improvement according to the invention.

The following table I shows an example containing figures enabling the present invention to be readily understood. This table I comprises seven lines I to VII, each line containing nine values each corresponding to a relative wingspan value r/R, said wingspan relative values being spaced out between 0.7 and 1. According to the invention, this relates to the improvement of a rectangular blade whose twist conforms to the one given by the curve 16 of FIG. 3;

the line I indicates the twist of a rectangular blade 1 before overtwist of the invention. It can be seen that said blade is linearly twisted at an angle of $-7.3'$ until r/R=0.925, said twist angle remaining constant between r/R=0.925 and r/R=1 (see curve 16);

the line (II) indicates the distribution measured from the wingspan lift coefficient Cz before overtwist according to the invention, this distribution conforming to the curve 9 of FIG. 2;

the line (III) indicates the distribution required for the limiting lift coefficient Czlim (Czlim1 and Czlim2) conforming to the curve 12 of FIG. 2;

the line (VI) indicates the distribution of the twist angle of the above equation (1), the lines (IV) and (V) showing the intermediate calculations of Czlim−Cz and of 1/1.3 (Czlim−CZ)

the line VII gives the difference between the limiting twist angle at a position r and the twist angle $\theta$ 0.7 R at r=0.7 R (curve 14 of FIG. 3).

Figure 4:
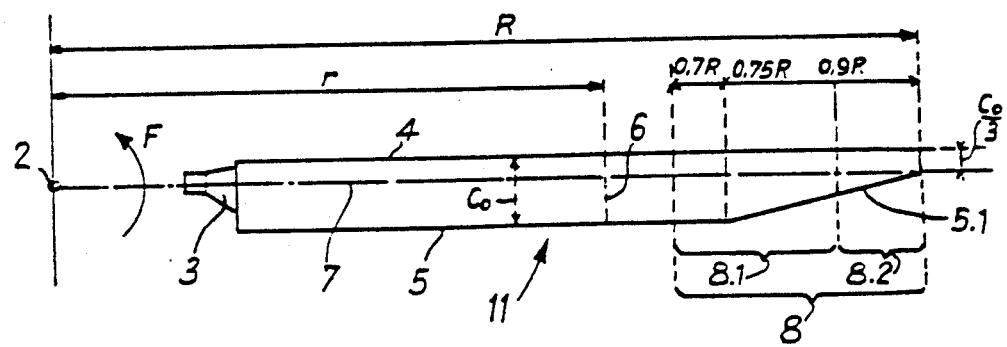
FIG. 4 is a diagrammatical plan view of a rotor blade at the trapezoidal-shaped tapered extremity.

FIG. 4 shows a blade 1.1 in all respects identical to the blade 1 shown on FIG. 1, except for its extreme part. In fact, instead of being rectangular as far as its extremity like the blade 1, the blade 1.1 is tapered at its extremity owing to the fact that the trailing edge 5 comprises a sloping extreme part 5.1 drawing closer to the leading edge 4. This extreme sloping part 5.1 of the trailing edge 5 is rectilinear and starts at r=0.75 R where the chord of the profile is equal to Co and ends at r=R where the chord of the profile is no longer then only Co/3.

Thus, in the blade 1.1, the wing reduces from r=0.75 R to r=R, so that this results in a reduction of the lift favoring the action of overtwist according to the present invention. It is therefore necessary to take account of this variation of the wing when it is desired to apply the above mentioned limits concerning a rectangular blade to a blade having an evolutive profile.

Generally speaking, if C(r) represents the evolution of the chord C according to the distance r, the above-mentioned limits Czlim (Czlim1 and Czlim2) defined for a rectilinear blade are corrected so as to define a new twist angle limit $\theta$limC and a new lift coefficient limit Czlim1, as defined by said equations (3) and (4).

Thus, it is possible to determine at each point of the extremity 8 of the blade 1.1 a limiting twist angle conforming to the invention from the characteristics of the rectangular blade of FIG. 1.

Table II gives an example containing figures, said example to be compared with the example containing figures in Table I.

the line (IV) indicates the ratio Co/C(r), representative of the taper ratio of the extremity of the blade 1.1 of FIG. 4;

the line (V) gives the limit $\theta$limC calculated by the above equation (4), and;

the line (VI) gives the difference $\Delta C = \theta\text{limC} - \theta 0.7$ R between the calculated limit $\theta$limC and the twist angle $\theta$ 0.7 R at the distance r=0.7 R.

FIG. 5 shows the difference $\Delta C$ (in degrees) according to the relative wingspan r/R and the corresponding curve 18 is obtained.

On FIG. 6, relating to the axis of the abscisses r/R of FIG. 7, the extremity of a blade 1.2 is represented. This blade 1.2 is at all points identical to the blade 1 of FIG. 1, except for the leading edge 4. In effect, between r=0.9475 R and r=R, instead of being rectilinear and parallel to the trailing edge 5, the leading edge 4 comprises a parabolic part 4.1, for example so that:

$$C(r)/Co = 1 - 234.375 \, (r/R - 0.9466)^2$$

At r=0.9475 R, the chord of the blade is equal to Co, but at r=R, this chord is equal Co/3.

TABLE II

| r/R | 0.70 | 0.75 | 0.80 | 0.85 | 0.90 | 0.925 | 0.95 | 0.975 | 1 |
|---|---|---|---|---|---|---|---|---|---|
| $\theta$ (I) | −5.12 | −5.48 | −5.85 | −6.21 | −6.58 | −6.76 | −6.76 | −6.76 | −6.76 |
| Cz (II) | 0.56 | 0.50 | 0.44 | 0.38 | 0.32 | 0.32 | 0.32 | 0.32 | 0.32 |
| Czlim (III) | 0.68 | 0.60 | 0.52 | 0.44 | 0.36 | 0.27 | 0.18 | 0.09 | 0 |
| Co/C(r) (IV) | 1 | 1 | 1.154 | 1.364 | 1.667 | 1.875 | 2.143 | 2.5 | 3 |
| $\theta$limC (V) | −4.20 | −4.71 | −4.62 | −4.52 | −4.43 | −5.33 | −6.25 | −7.49 | −9.22 |
| $\theta$limC - $\theta$0.7R (VI) | 0 | −0.51 | −0.42 | −0.32 | −0.23 | −1.13 | −2.05 | −3.29 | −5.02 |

From the foregoing, it ensues that the limit $\theta$limC corresponding to said blade 1.2 can be easily calculated. The corresponding calculations are listed in the following table III. This limit $\theta$limC, or rather the difference $\Delta C$ between the latter and the twist angle $\theta 0.7$ R at r=0.7 R is represented by the curve 19 of FIG. 8. To

TABLE I

| r/R | 0.70 | 0.75 | 0.80 | 0.85 | 0.90 | 0.925 | 0.95 | 0.975 | 1 |
|---|---|---|---|---|---|---|---|---|---|
| $\theta$ (I) | −5.12 | −5.48 | −5.85 | −6.21 | −6.58 | −6.76 | −6.76 | −6.76 | −6.76 |
| Cz (II) | 0.56 | 0.50 | 0.44 | 0.38 | 0.32 | 0.32 | 0.32 | 0.32 | 0.32 |
| Czlim (III) | 0.68 | 0.60 | 0.52 | 0.44 | 0.36 | 0.27 | 0.18 | 0.09 | 0 |
| Czlim - Cz (IV) | 0.12 | 0.10 | 0.08 | 0.06 | 0.04 | −0.05 | −0.14 | −0.23 | −0.32 |
| $\frac{1}{0.13}$ (Czlim-Cz) (V) | 0.92 | 0.77 | 0.61 | 0.46 | 0.31 | −0.38 | −1.07 | −1.77 | −2.46 |
| $\theta$lim (VI) | −4.19 | −4.71 | −5.23 | −5.28 | −6.27 | −7.14 | −7.83 | −8.53 | −9.22 |
| $\theta$lim - $\theta$0.7R (VII) | 0 | −0.51 | −1.03 | −1.09 | −2.07 | −2.94 | −3.64 | −4.33 | −5.02 |

In Table II:

the lines (I), (II) and (III) are identical to the corresponding lines of Table I and respectively indicate the twist, the measured distribution of the lift coefficient and the required distribution of the lift coefficient of the rectangular blade 1 before improvement according to the invention;

plot this curve 19 between r=0.7 R and r=0.95 R, as well as for r=R, the results given in Table III have been used. On the other hand, between r=0.95 R and r=R, a linear twist connection 19.1 has been embodied.

On FIG. 8, from the curve 19 which represents a twist limit which may be qualified as "theoretic", a curve 20 is plotted, said curve representing $\Delta C + 0.5°$, this value 0.5° constituting a tolerance with respect to the limit defined by the curve 19. The "practical" limit of twist illustrated by the curve 20 is thus obtained. This practical twist limit has made it possible to define the real twist of the blade 1.2, according to the invention. This real twist is represented by the curve 21 of FIG. 7 and illustrated by means of the difference ΔC by the curve 22 of FIG. 8.

FIGS. 7 and 8 also show the curves 23 and 24 and illustrate a linear twist of $-10°$ for the blade 1.2. It can be seen that the overtwisted blade 1.2 according to the invention is linearly twisted between $r=0.7$ R and $r=0.85$ R, then overtwisted between $r=0.85$ R and $r=R$ in the manner described above.

TABLE III

| r/R | 0.70 | 0.80 | 0.85 | 0.90 | 0.95 | 1 |
|---|---|---|---|---|---|---|
| θ (I) | −5.12 | −5.85 | −6.21 | −6.56 | −6.76 | −6.76 |
| Cz (II) | 0.56 | 0.44 | 0.38 | 0.32 | 0.32 | 0.32 |
| Czlim (III) | 0.68 | 0.52 | 0.44 | 0.36 | 0.18 | 0 |
| Co/C(r) (IV) | 1 | 1 | 1 | 1 | 1 | 3 |
| θlimC (V) | −4.20 | −5.23 | −5.75 | −6.25 | −7.84 | −9.22 |
| θlimC - θ0.7R (VI) | 0 | −1.03 | −1.55 | −2.05 | −3.64 | −5.02 |

So as to illustrate the improvements brought about by the present invention, comparative tests have been carried out between a rotor 25.1 equipped with three linearly twisted blades 1.2 (conforming to the curves 23 and 24) and an identical rotor 25.2 equipped with three blades 1.2 overtwisted at their extremities according to the invention (conforming to the curves 21 and 22).

These comparative tests have been carried out on a test bench 26 diagrammatically represented on FIG. 9.

This test bench 26 mainly comprises a balance 27, joined at 28 and carrying a motor 29, a transmission 30 and a boss 31 to which either the rotor 25.1 or the rotor 25.2 may be secured.

Said boss 31 is disposed at one end of the balance 27, whereas a dynamometer 32 is connected to the other end of said balance. It is understood that when a rotor is secured to the boss 31 and is rotary-driven by the motor 29 and transmission 30, whose delivered power may be accurately measured by means (non-represented), it exerts a thrust Fz able to be measured by the dynamometer 32.

Moreover, the test bench 26 comprises microphones 34 connected to a sound level measurement device 33.

Figure 10:
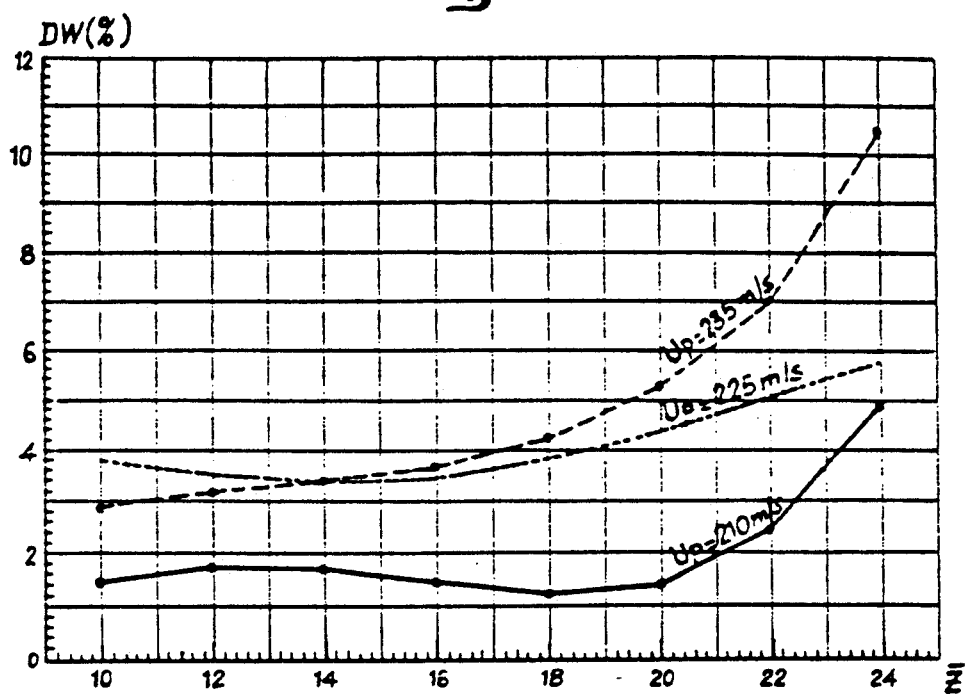
FIG. 10 is a diagram illustrating the improvement of the aerodynamic performances of a rotor equipped with blades as shown on FIG. 6 and over-twisted according to the invention with respect to a known rotor equipped with identical blades but with linear twist.

Tests have been carried out by successively securing the rotors 24.1 and 24.2 to the boss 31 and a measurement is made of the power consumed by these rotors according to the reduced thrust $\bar{z}$ for three peripherical speeds Up respectively equal to 210 m/s, 225 m/s and 235 m/s. The results are illustrated by FIG. 10 on which DW represents, in percentage terms, the reduction of the power consumed by the rotor 25.2 with respect to the power consumed by the rotor 25.1 so as to ensure a given power. Such a reduction of the power consumed by the rotor is about 3% to 4% for normal lifts and peripherical speeds. It can reach 10% for high thrusts ($\bar{z}=24$) and the peripherical speed of 235 m/s. The aerodynamic performances of the rotor according to the invention are considerably improved with respect to those of known rotors.

Figure 11:
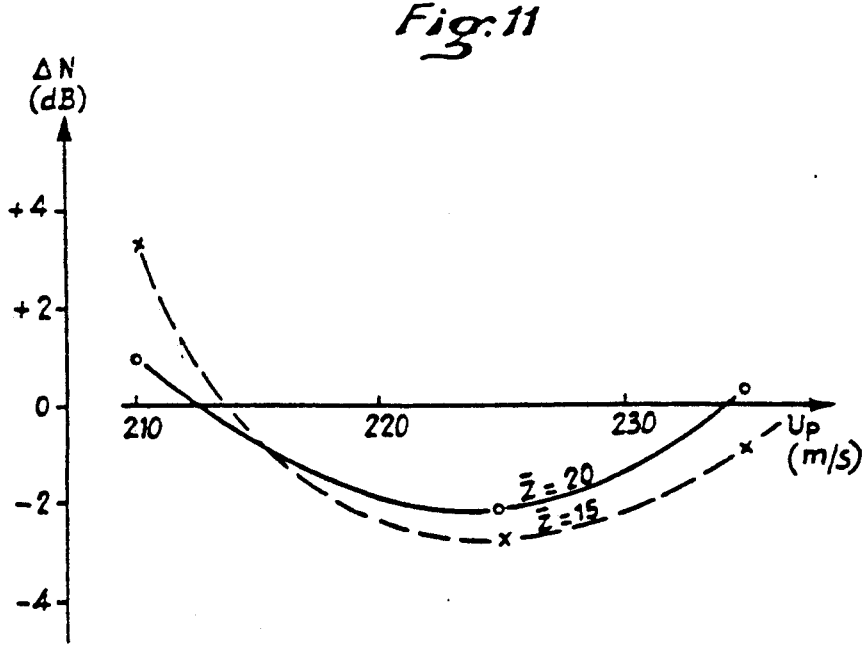
FIG. 11 is a diagram illustrating the reduction of the operating noise of the rotor according to the invention with respect to an identical rotor whose blades are linearly twisted.

Also represented on FIG. 1 is the noise reduction ΔN (in dB) of the rotor 25.2 according to the invention with respect to the rotor 25.1. FIG. 11 shows that in stationary flight and for usual thrusts ($\bar{z}=15$), a noise reduction of about 2 dB is obtained by the rotor 25.2 with respect to the rotor 25.1 for a peripherical speed range between 220 and 230 m/s. In moving flight, for high speed phases and descending phases where edge vortices/blades interactions are more likely to occur, noise is more significantly reduced.

What is claimed is:

1. Blade for an aircraft rotor whose successive elementary sections along at least the larger part of the wingspan R present a constant chord Co and said elementary sections are twisted from the root of said blade towards the extremity of the latter by an angle θ whose variation dθ/dr according to the wingspan position r of a given elementary section is constant, wherein said blade exhibits in the end zone extending at least between 0.85 R and at least 0.95 R an excess twist so that the resultant twist in said zone is less than or at the most equal as an absolute value to the limiting twist given by:

$$\theta lim = \theta + 1(Czlim - Cz), \quad (1)$$

an equation in which k is the ratio of k the variation of the lift coefficient Cz to the variation of incidence i and Czlim is an upper limiting value for the lift coefficient Cz so that, firstly, in a first fraction of the end zone extending at least between $r=0.85$ R and approximatively $r=0.9$ R, the limiting lift coefficient has a value $$Czlim1 = Czm - a(r/R - b), \quad (2)$$

an equation in which Czm is the mean lift coefficient of said rotor, a and b are constants at least equal to 1.6 and 0.87 respectively and being such that secondly, in a fraction of the end zone extending between approximately $r=0.9$ R and at least $r=0.95$ R, the limiting lift coefficient Czlim2 has a value linearly decreasing from the value of Czlim1 given by the equation (2) for $r=0.9$ R to the zero value for $r=R$.

2. Rotor blade according to the claim 1, wherein said first extremity zone fraction extends between $r=0.7$ R and approximatively $r=0.9$ R.

3. Rotor blade according to claim 1, wherein said second extremity zone fraction extends approximatively between $r=0.9$ R and $r=R$.

4. Rotor blade according to claim 1, so that in said first and second extremity zone fractions, said successive elementary sections exhibit an evolutive chord which is a function C(r) of the wingspan position r of a given elementary section, wherein, on the span of said first and second extremity zone fractions, the twist of said blade is, as an absolute value, advantageously at least equal to the limiting twist θlimC given by:

$$\theta limC = \theta + 1(Czlim.Co/C(r) - Cz) \quad (3)$$

an equation in k which the lift coefficient Czlim is selected in said extremity zone fractions to be at the most equal to a value CzlimC so that $$CzlimC = Czlim.Co/C(r), \quad (4)$$

an expression in which Czlim represents either Czlim1 or Czlim2 according to that of said first or second extremity zone fraction.

5. Rotor blade according to claim 1, wherein on the span of said first and second extremity zone fractions, the twist of said blade is, as an absolute value, at least equal to said limiting twist reduced by one tolerance.

6. Blade according to claim 5, wherein said tolerance is about 0.5°.

7. Rotor blade according claim 4, wherein said second extremity zone fraction is defined by the range approximatively extending from r=0.9 R to r=0.95 R and by the point r=R, a linear twist connection being embodied between r=0.95 R and r=R, regardless of the function C(r).

* * * * *